(12) United States Patent
Jiang et al.

(10) Patent No.: US 10,274,642 B2
(45) Date of Patent: Apr. 30, 2019

(54) ULTRAHIGH-RESOLUTION PHOTONIC-CRYSTAL SUPERPRISM AND METHOD FOR DESIGNING THE SAME

(71) Applicants: SHANGHAI INSTITUTE OF MICROSYSTEM AND INFORMATION TECHNOLOGY, CHINESE ACADEMY OF SCIENCES, Shanghai (CN); FUDAN UNIVERSITY, Shanghai (CN)

(72) Inventors: Xunya Jiang, Shanghai (CN); Wei Li, Shanghai (CN); Xiaogang Zhang, Shanghai (CN); Xulin Lin, Shanghai (CN)

(73) Assignees: SHANGHAI INSTITUTE OF MICROSYSTEM AND INFORMATION TECHNOLOGY, CHINESE ACADEMY OF SCIENCES, Shanghai (CN); FUDAN UNIVERSITY, Shanghai (CN)

( * ) Notice: Subject to any disclaimer, the term of this patent is extended or adjusted under 35 U.S.C. 154(b) by 402 days.

(21) Appl. No.: 15/301,505

(22) PCT Filed: Feb. 4, 2015

(86) PCT No.: PCT/CN2015/072194
§ 371 (c)(1),
(2) Date: Mar. 1, 2017

(87) PCT Pub. No.: WO2015/149584
PCT Pub. Date: Oct. 8, 2015

(65) Prior Publication Data
US 2017/0168196 A1    Jun. 15, 2017

(30) Foreign Application Priority Data

Apr. 1, 2014 (CN) .......................... 2014 1 0129855

(51) Int. Cl.
| | | |
|---|---|---|
| *G02B 27/12* | (2006.01) | |
| *G02B 1/00* | (2006.01) | |
| *G02B 27/00* | (2006.01) | |
| *G02B 27/10* | (2006.01) | |

(52) U.S. Cl.
CPC .......... *G02B 1/005* (2013.01); *G02B 27/0012* (2013.01); *G02B 27/1006* (2013.01); *G02B 27/126* (2013.01)

(58) Field of Classification Search
CPC .. G02B 1/005; G02B 27/126; G02B 27/1006; G02B 27/0012
See application file for complete search history.

(56) References Cited

FOREIGN PATENT DOCUMENTS

| CN | 101315588 | * | 1/2009 | ......... H04B 10/2513 |
|---|---|---|---|---|
| CN | 101345588 A | | 1/2009 | |

OTHER PUBLICATIONS

May 11, 2015 Search Report issued in International Patent Application No. PCT/CN2015/072194.
May 11, 2015 Written Opinion issued in International Patent Application No. PCT/CN2015/072194.
(Continued)

*Primary Examiner* — Joseph P Martinez
(74) *Attorney, Agent, or Firm* — Oliff PLC

(57) ABSTRACT

A method for designing an ultrahigh-resolution photonic-crystal superprism, including the following steps: selecting a medium material, and determining a structure type and parameter of a photonic crystal, obtaining the photonic crystal's equifrequency graph, and looking for an auto-collimation area; obtaining the group velocity distribution of points in the equifrequency graph, and looking for a low group velocity area; optimizing the photonic crystal's structure parameter, facilitating the auto-collimation and the low group velocity area in the photonic crystal's equifrequency graph to be overlapped as much as possible, and defining overlapping area as a work area; obtaining an equal incidence-angle line, rotating the photonic crystal to intersect (Continued)

the equal incidence-angle line with the work area, and selecting the appropriate incidence angle in an intersection point to complete the design of the photonic-crystal superprism. When light makes incidence via the above incidence angle, the photonic crystal may separate light with different frequencies significantly.

12 Claims, 6 Drawing Sheets

(56) References Cited

OTHER PUBLICATIONS

Chen et al., "The light intensity-dependent superprism phenomenon in nonlinear photonic crystals" Acta Physica Sinica, vo. 58, Feb. 2009, pp. 1025-1030.
Bernier et al., "Analysis of Ultra Refraction Properties in Strong Index Contrast Slab Photonic Crystals," Optics Communications, vol. 274, 2007, pp. 241-247.
Ibanescu et al., "Enhanced Photonic Band-Gap Confinement via Van Hove Saddle Point Singularities," Physical Review Letters, vol. 96, Jan. 2006, pp. 033904-1-033904-4.
Liu et al., "Efficient computation of equifrequency surfaces and density of states in photonic crystals using Dirichlet-to-Neumann maps," Journal of the Optical Society of America B, vol. 28, Jul. 2011, pp. 1837-1843.
Steel et al., "Analytic properties of photonic crystal superprism parameters," Physical Review E, vol. 71, 2005, pp. 056608-1-056608-9.

* cited by examiner

ULTRAHIGH-RESOLUTION PHOTONIC-CRYSTAL SUPERPRISM AND METHOD FOR DESIGNING THE SAME

BACKGROUND OF THE PRESENT INVENTION

Field of Invention

The present invention belongs to the fields of photoelectron and optical communication, and relates to an ultrahigh-resolution photonic-crystal superprism and a method for designing the same.

Description of Related Arts

A photonic crystal was independently proposed by S. John and E. Yablonovitch in 1987, respectively, it is an artificial microstructure formed by mediums which have different refractive indexes with periodically arranging. Because a dielectric constant has periodicity in space, a spatial refractive index is periodically changed. When the change of the dielectric constant is large enough and the period of the change is equal to the wavelength of light, the dispersion relation of light wave will have a band structure, that is, Photonic Band structures. These terminated frequency intervals are called as "Photonic Band Gap" (PBG), light or electromagnetic wave whose frequency falls within a forbidden band may not be propagated. A periodic dielectric structure with the "Photonic Band Gap" is called as the photonic crystal.

The refractive index of the photonic crystal changes periodically in space, which may effectively control the propagation of photons. Since the concept of the photonic crystal has been put forward, people give extensive attention to the application of the photonic crystal. Especially in the field of optical communication technology, a photonic crystal fiber, a micro resonator laser, a filter, an integrated optical path and other photonic crystal devices have broad application prospects. The continuous improvement in the microfabrication technology of a semiconductor material has greatly promoted the application of a 2-dimensional or even 3-dimensional photonic crystal device in practice. In recent years, a photonic-crystal superprism and its design for a high-performance spectrometer and a wavelength division multiplexer have become the focus of attention in the industry, because the spectrometer and the wavelength division multiplexer are one of core devices in the optical communication, optical detection and other fields.

The photonic-crystal superprism has the ability to separate the electromagnetic wave with a continuous frequency within the photonic crystal in accordance with a certain number of channels. It is characterized by the followings: on one hand, this wavelength division multiplexer has small volume and is easy to be integrated; on the other hand, it has a very high frequency (wavelength) resolution. The existing literatures have disclosed a photonic-crystal superprism, it uses an area where a constant-frequency contour of the photonic crystal has a sharp change to work. This kind of the superprism inevitably has frequency missing, easy crosstalk, a relatively large device area and other problems, therefore, it is not conducive to the application of the device in the integrated optical path.

Therefore, in order to avoid the above problems, we have to take a new physical mechanism to get a new type of photonic crystal superprism through a new design.

SUMMARY OF THE PRESENT INVENTION

In view of the disadvantages of the prior art described above, the present invention aims at providing an ultrahigh-resolution photonic-crystal superprism and a method for designing the same to solve the problems of the photonic crystal superprism in the prior art of frequency missing, high-level crosstalk, a relatively large device area and other problems.

In order to realize the above objectives and other related objectives, the present invention provides a method for designing an ultrahigh-resolution photonic-crystal superprism, the design method comprises at least the following steps:

Step S1: selecting a medium material, and determining a structure type and a structure parameter of a photonic crystal;

Step S2: obtaining an equifrequency graph of the photonic crystal, and looking for an auto-collimation area in the equifrequency graph;

Step S3: obtaining the group velocity distribution of each point in the equifrequency graph, and looking for a low group velocity area;

Step S4: optimizing the structure parameter of the photonic crystal, facilitating the auto-collimation area and the low group velocity area in the equifrequency graph of the photonic crystal to be overlapped as much as possible, and defining the overlapping area as a work area;

Step S5: obtaining an equal incidence-angle line, rotating the photonic crystal to intersect the equal incidence-angle line with the work area, and selecting the appropriate incidence angle in an intersection point to complete the design of the photonic-crystal superprism.

Preferably, the medium material is selected from at least one of silicon, silicon dioxide, germanium, gallium arsenide and gallium nitride.

Preferably, the structure type comprises a 2-dimensional structure or a 3-dimensional structure.

Preferably, the structure type comprises a porous structure or a medium column structure.

Preferably, the structure type comprises a square-lattice primitive-cell structure, a rectangular-lattice primitive-cell structure, a triangular-lattice primitive-cell structure or a hexagonal-lattice primitive-cell structure.

Preferably, in Step S4, the structure parameter comprises filling ratio, the constant term of a lattice, as well as the thickness and the length of the photonic crystal, at least one of which is changed to optimize.

Preferably, the auto-collimation area comprises an auto-collimation area passing through the entire Brillouin area or a local auto-collimation area.

Preferably, the auto-collimation area comprises a strict auto-collimation area and an adjacent approximate auto-collimation area thereof.

Preferably, the low group velocity is that the group velocity of light propagating in the photonic crystal is less than 3E7 meter/second.

Preferably, the equifrequency graph, the group velocity and the equal incidence-angle line are obtained by theoretical calculation or by an experimental means.

The present invention also provides a photonic-crystal superprism, an auto-collimation area and a low group velocity area in an equifrequency graph of the photonic crystal superprism are overlapped, and an equal incidence angle thereof is intersected with the overlapped area.

Preferably, the photonic-crystal superprism is a porous structure or a medium column structure.

As described above, the ultrahigh-resolution photonic-crystal superprism of the present invention and the method for designing the same have the following beneficial effects: the present invention optimizes the structure parameter of the photonic crystal to facilitate the auto-collimation area and the low group velocity area in the equifrequency graph of the photonic crystal to be overlapped as much as possible, defines the overlapping area as a work area, appropriately rotates the photonic crystal to intersect the equal incidence-angle line with the work area, selects the appropriate incidence angle, and facilitates the incidence angle to be a right angle as much as possible to conveniently design the optical path of an instrument. The photonic-crystal superprism of the invention is very sensitive to the frequency of the light making incidence at the above incidence angle, and may separate the light with different frequencies significantly. Meanwhile, the photonic-crystal superprism of the invention has good integrality and wide application range, may be applied to a high-resolution spectrometer, a wavelength division multiplexer, a high sensitive detector and the like, and has important practical value.

DESCRIPTION OF COMPONENT MARK NUMBERS

S1~S5: steps

DETAILED DESCRIPTION OF THE PREFERRED EMBODIMENTS

The embodiments of the invention are described by way of specific examples, and other advantages and utilities of the invention will be readily apparent to those skilled in the art from the disclosure of this description. The present invention may also be implemented or applied via other different specific embodiments, the various details in this description may also be based on various views and applications to make various modifications or changes without departing from the spirit of the invention.

Please see FIG. 1-FIG. 7c. It shall be noted that the illustrations provided in the present embodiment describe the basic concept of the present invention only in a schematic manner. The figures only show the components related to the present invention instead of being drawn according to the number, shape and size of the components at the time of actual implementation, the type, quantity and proportion of the various components in its actual implementation may be a random change, and the layout and patterns of its components may also be more complex.

Figure 1:
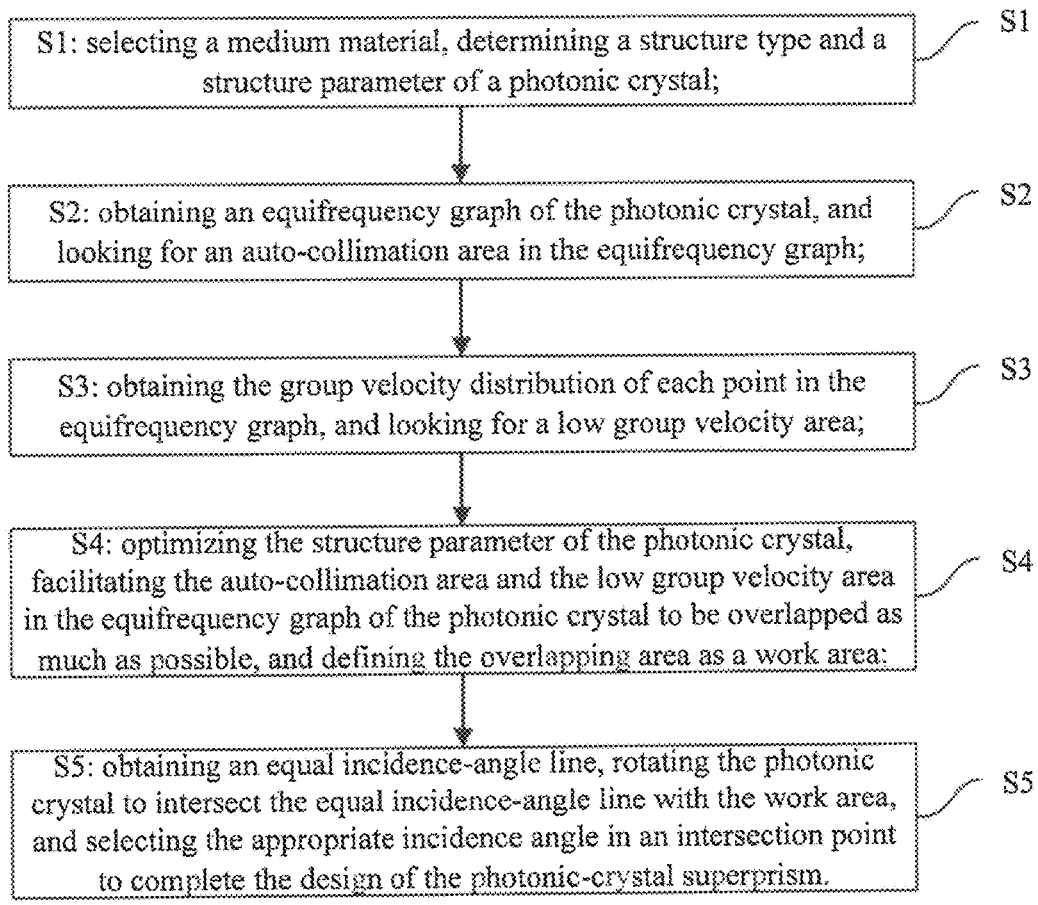
FIG. 1 shows a flow chart of a method for designing an ultrahigh-resolution photonic-crystal superprism of the present invention.

The present invention provides a method for designing an ultrahigh-resolution photonic-crystal superprism, FIG. 1 shows a flow chart of the method, the method comprises at least the following steps:

Step S1: selecting a medium material, and determining a structure type and a structure parameter of a photonic, crystal;

Step S2: obtaining an equifrequency graph of the photonic crystal, and looking for an auto-collimation area in the equifrequency graph;

Step S3: obtaining the group velocity distribution of each point in the equifrequency graph, and looking for a low group velocity area;

Step S4: optimizing the structure parameter of the photonic crystal, facilitating the auto-collimation area and the low group velocity area in the equifrequency graph of the photonic crystal to be overlapped as much as possible, and defining the overlapping area as a work area;

Step S5: obtaining an equal incidence-angle line, rotating the photonic crystal to intersect the equal incidence-angle line with the work area, and selecting the appropriate incidence angle in an intersection point to complete the design of the photonic-crystal superprism.

Figure 2:
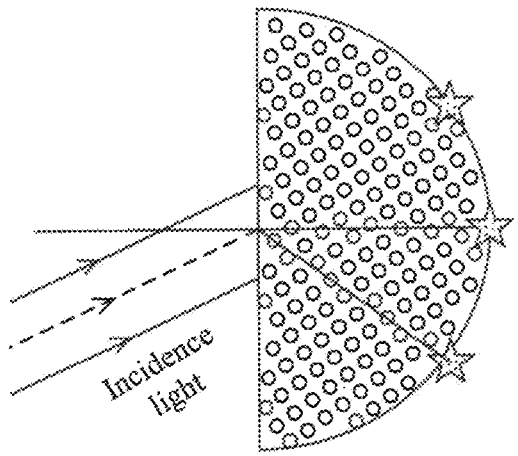
FIG. 2 shows a diagram that an ultrahigh-resolution photonic-crystal superprism of the present invention separates incidence light.

FIG. 2 shows a diagram that the ultrahigh-resolution photonic-crystal superprism of the present invention separates incidence lights. When light makes incidence at the incidence angle, the photonic crystal is very sensitive to the frequency of the light, and may separate the incidence light with different frequencies significantly, the three star marks on an outer edge of the superprism in FIG. 2 represent the three exit-light positions. As an example, the photonic-crystal superprism in FIG. 2 consists of a plurality of medium columns.

The method for designing the ultrahigh-resolution photonic-crystal superprism of the present invention will be described with reference to a specific embodiment.

Figure 3:
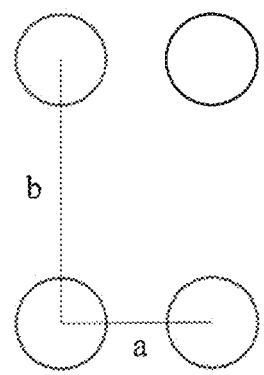
FIG. 3 shows a diagram of the arrangement of a medium column in a photonic crystal.

First, please refer to FIG. 3, and implement Step S1 selecting the medium material, and determining the structure type and the structure parameter of the photonic crystal.

Specifically, the medium material is selected from at least one of silicon, silicon dioxide, germanium and gallium nitride. In the present embodiment, the medium material silicon is taken as an example, its refractive index n is 3.4, its central wavelength is 1.55 microns, the wavelength belongs to the currently widely used wave band of optical communication, and the preparation technology of a silicon material is mature.

Specifically, the structure type of the photonic crystal includes a two-dimensional structure or a three-dimensional structure and further includes a porous structure or a medium column structure, its arrangement includes but not limited to a square-lattice primitive-cell structure, a rectangular-lattice primitive-cell structure, a triangular-lattice primitive-cell structure or a hexagonal-lattice primitive-cell structure. As an example, the photonic crystal employs the medium column structure, the radius of the medium column is 0.32a, wherein a is the lattice period of the photonic crystal, as shown in FIG. 3, the minimum arrangement unit of the medium column structure constitutes the rectangular-lattice structure, wherein the width of a rectangular lattice is a, length is b, and length-width ratio is 1.8.

Figure 4:
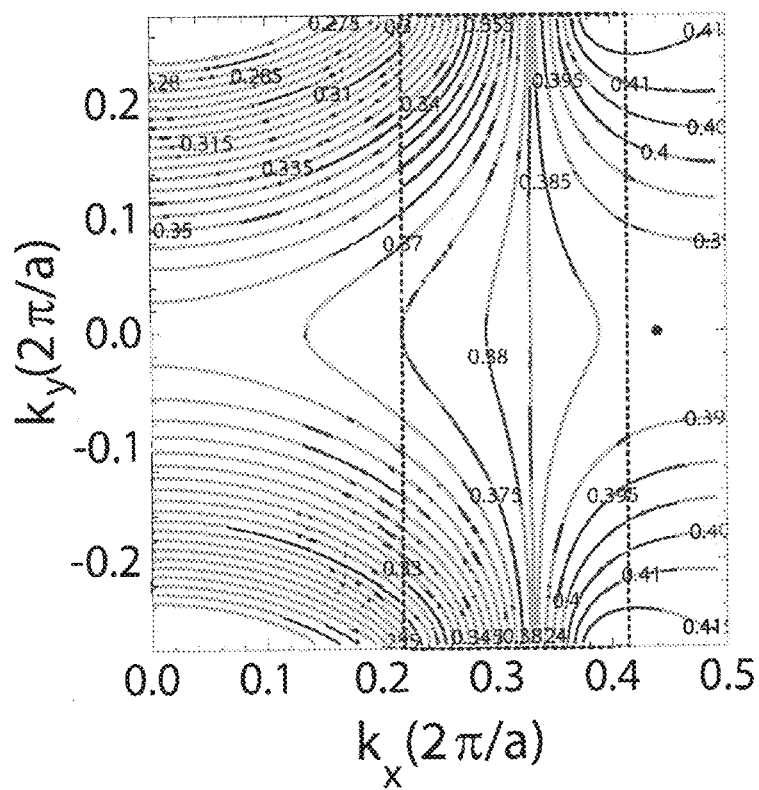
FIG. 4 shows an equifrequency graph of a photonic crystal.

Then, please refer to FIG. 4, and implement Step S2: obtaining the equifrequency graph of the photonic crystal, and looking for the auto-collimation area in the equifrequency graph.

Specifically, the equifrequency graph of the photonic crystal may be obtained by theoretical calculation or an experimental means. As an example, the present embodiment utilizes a plane wave expansion method to calculate the dispersion relation of the above photonic-crystal structure, selects the second energy band and calculates the equifrequency graph of the energy band. The calculation of the equifrequency graph of the photonic crystal is well known in the art, for example, the literature of "Victor Liu and Shanhui Fan, 'Efficient computation of equifrequency surfaces and density of states in photonic crystals using Dirichlet-to-Neumann maps' Journal of the Optical Society of America B, Vol. 28, pp. 1837 (2011)" gave an example of calculating the equifrequency graph of the photonic crystal, the detailed calculation process is not repeated herein.

FIG. 4 shows the equifrequency graph of the second energy band of the photonic crystal obtained by the calculation with the plane-wave expansion method in the present embodiment, its abscissa is $k_x$ while its ordinate is $k_y$, which represent the wave vector component in the x-axis direction and the wave vector component in the y-axis direction, respectively, their units are both $2\pi/a$. As shown in FIG. 4, a plurality of constant-frequency contours are included, the numbers in the figures represent the frequencies corresponding to the constant-frequency contours.

Specifically, the auto-collimation area comprises the auto-collimation area passing through the entire Brillouin area or the local auto-collimation area. The auto-collimation area comprises a strict auto-collimation area and an adjacent approximate auto-collimation area thereof. As shown in FIG. 4, wherein the constant-frequency contour with the frequency of 0.38 is a straight line and belongs to the strict auto-collimation area, the propagation direction of the light with any incidence angle on the straight line in the photonic crystal is perpendicular to the constant-frequency contour, i.e., the propagation in the x-direction. The constant-frequency contour with the left frequency of 0.375 and the constant-frequency contour with the right frequency of 0.385 may be regarded as the approximate auto-collimation area. The dashed-line frame in FIG. 4 represents the auto-collimation area selected in the present embodiment.

Figure 5:
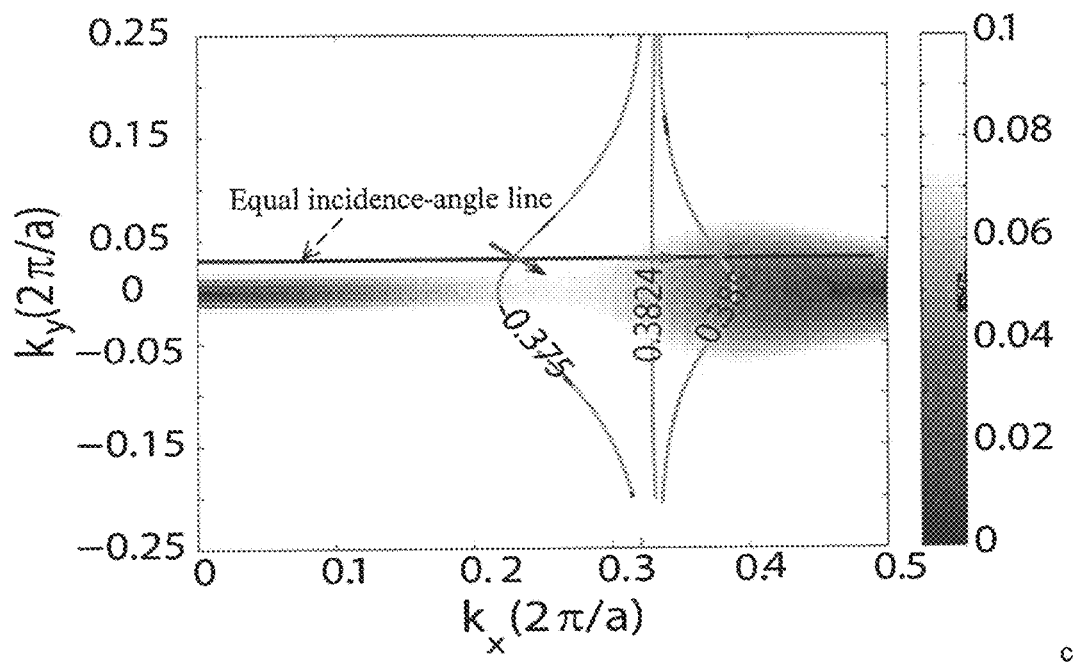
FIG. 5 shows an equal incidence-angle line and the distribution of a low group velocity.

Please refer to FIG. 5, and implement Step S3: obtaining the group velocity distribution of each point in the equifrequency graph, and looking for the low group velocity area.

Specifically, the group velocity may be obtained by the theoretical calculations or by the experimental means. A theoretical calculation method of the group velocity is well known in the art, for example, the literature of "M. J. Steel, R. Zoli, C. Grillet, R. C. McPhedran, C. Martijn de Sterke, A. Norton, P. Bassi, and B. J. Eggleton, 'Analytic properties of photonic-crystal superprism parameters' Physical Review E, vol. 71, p.p 056608 (2005)" gave the specific calculation method of the group velocity of the photonic crystal, and is not repeated herein.

It should be noted that the low group velocity in the present invention refers to the group velocity of light propagating in the photonic crystal that is less than 3E7 meter/second. The shaded portion in FIG. 5 is the low group velocity area. The darker the shaded portion is, the lower the group velocity is.

Figure 6A:
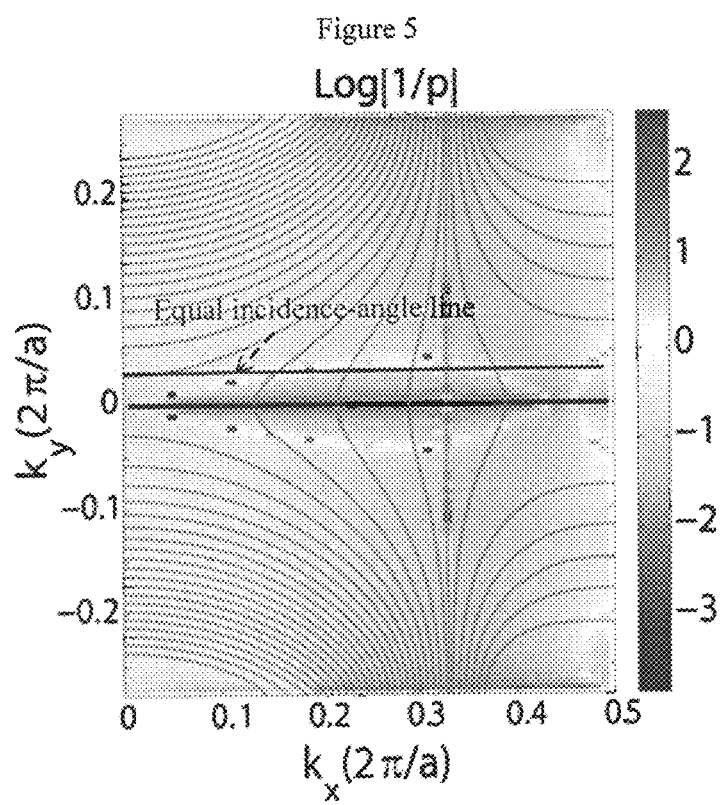
FIGS. 6a-6c show the parameter distribution of a photonic-crystal superprism.
Figure 6B:
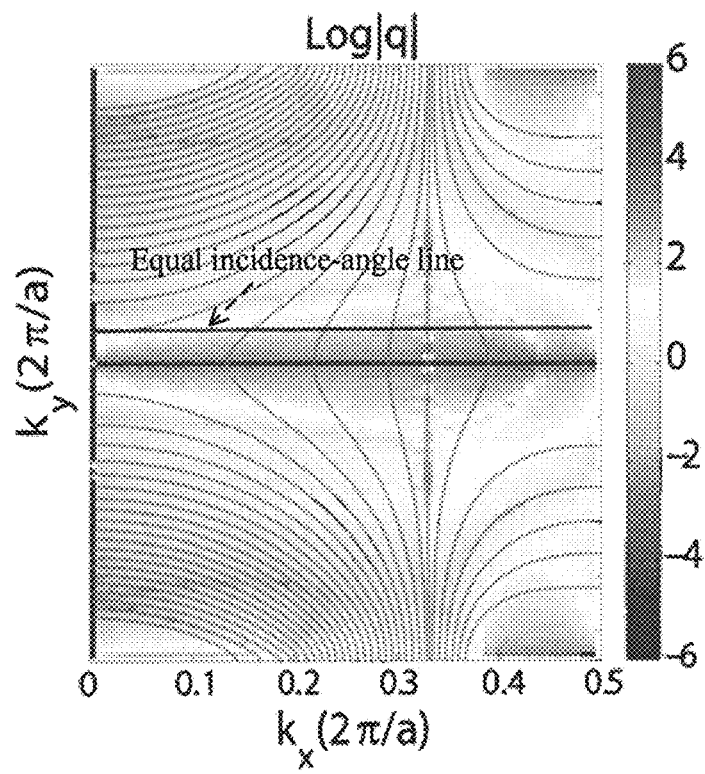
Figure 6C:
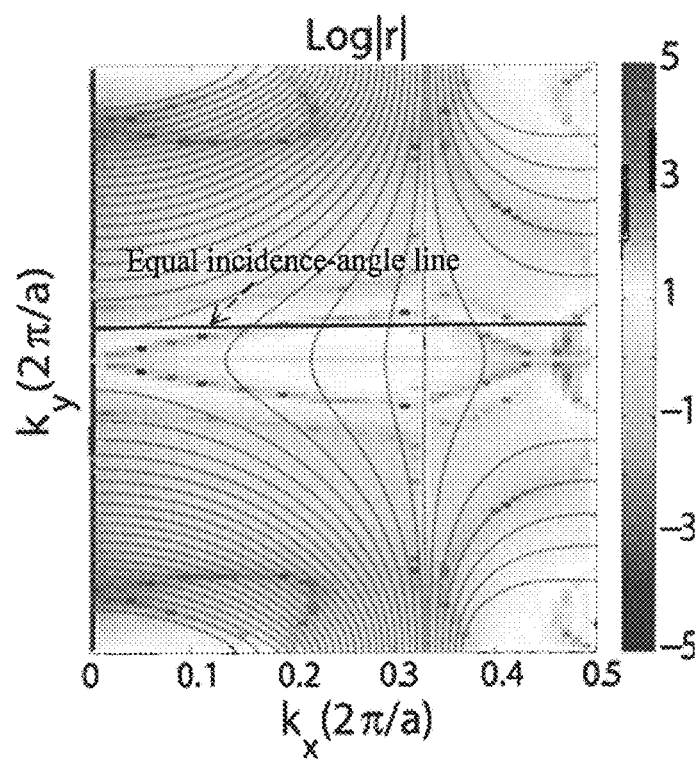

Meanwhile, the parameter distribution of the photonic-crystal superprism may be calculated with the method in the above-mentioned literature. FIGS. 6a-6c show the parameter distribution of the photonic-crystal superprism. The shadow in FIG. 6a is the distribution of Parameter Value Log |1/p|. The shade of a color reflects the change in the Value, wherein p is generalized angle resolution, reflecting the divergence degree of the outgoing light of a prism, the higher the angle resolution is, the weaker the divergence degree is, and the better the performance of the superprism is; the shadow in FIG. 6b is the distribution of Parameter Value Log |q|, wherein q is generalized chromatic dispersion; the shadow in FIG. 6c is the distribution of Parameter Value Log |r|, wherein r=q/p, r is a resolution parameter, the larger the value of r is, the better the performance of the photonic crystal super prism is.

Step S4 is implemented: optimizing the structure parameter of the photonic crystal, facilitating the auto-collimation area and the low group velocity area in the equifrequency graph of the photonic crystal to be overlapped as much as possible, and defining the overlapping area to be a work area.

Specifically, the structure parameter comprises filling ratio, the constant term of a lattice, as well as the thickness and the length of the photonic crystal, at least one of which is changed to optimize so that Resolution Parameter r of the photonic-crystal superprism is increased. Through the comparison of several groups, the group that the overlapping degree of the auto-collimation area and the low group velocity area of the equifrequency graphs is the highest is selected, and the structural parameters of the two areas of this group are regarded as the optimal values, their overlapping area is defined as the work area.

Step S5 is finally implemented: obtaining the equal incidence-angle line, rotating the photonic crystal to intersect the equal incidence-angle line with the work area, and selecting the appropriate incidence angle in an intersection point to complete the design of the photonic-crystal superprism.

Specifically, the calculation method of the equal incidence angle is as follows:

$$k_x = (\omega/c) \cdot \cos \theta_{in},$$

$$k_y = (\omega/c) \cdot \sin \theta_{in},$$

Wherein, is a given incidence angle, $\Omega$ is the circular frequency of light. For a given incidence angle, Wave Vectors $k_x$ and $k_y$ are different at different circular frequencies, if the wave vectors are connected together, the equal incidence-angle line will be obtained. Of course, an experimental method may also be used to test and describe to get the equal incidence-angle line.

FIG. 5 shows the equal incidence-angle line and the distribution of the low group velocity, the arrows in the figure show the direction of light propagation at the intersection point of the three equifrequency lines of the equal incidence-angle line and the auto-collimation area. FIGS. 6a-6c also show the equal incidence-angle line.

It shall be pointed out that there is more than one equal incidence-angle lines, here, only the equal incidence angle intersecting with the work area is selected, the appropriate incidence angle is then selected at the intersection point. It should be noted that the so-called appropriate incidence angle herein refers to the incidence angle that is close to a vertical incidence angle as much as possible so as to avoid an excessive incidence angle, thereby reducing the complexity of an optical path design.

Figure 7A:
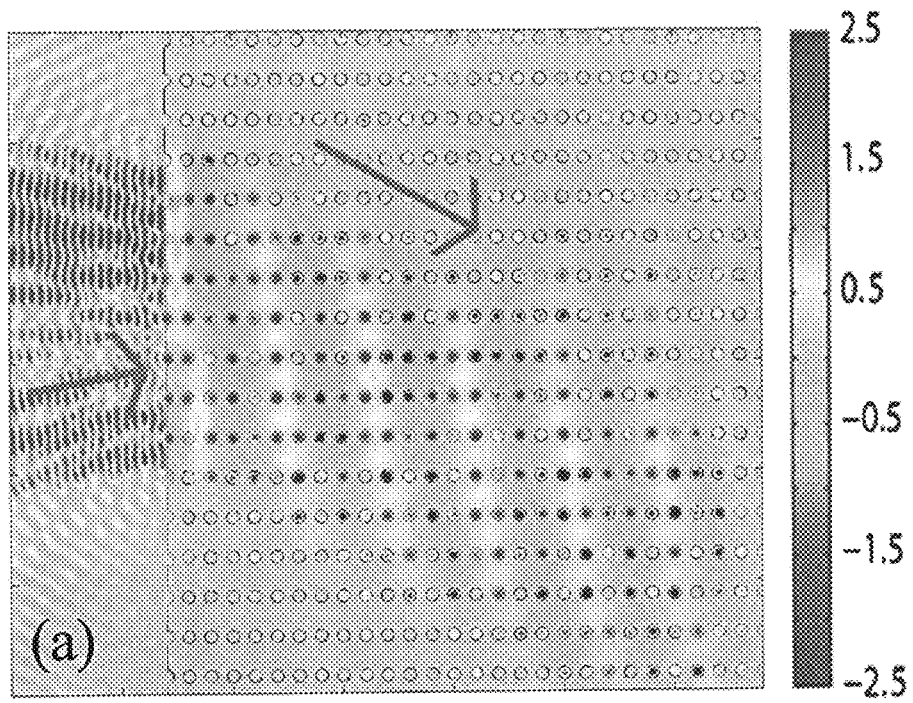
FIGS. 7a-7c show a three-channel frequency-division diagram of a photonic-crystal superprism.
Figure 7B:
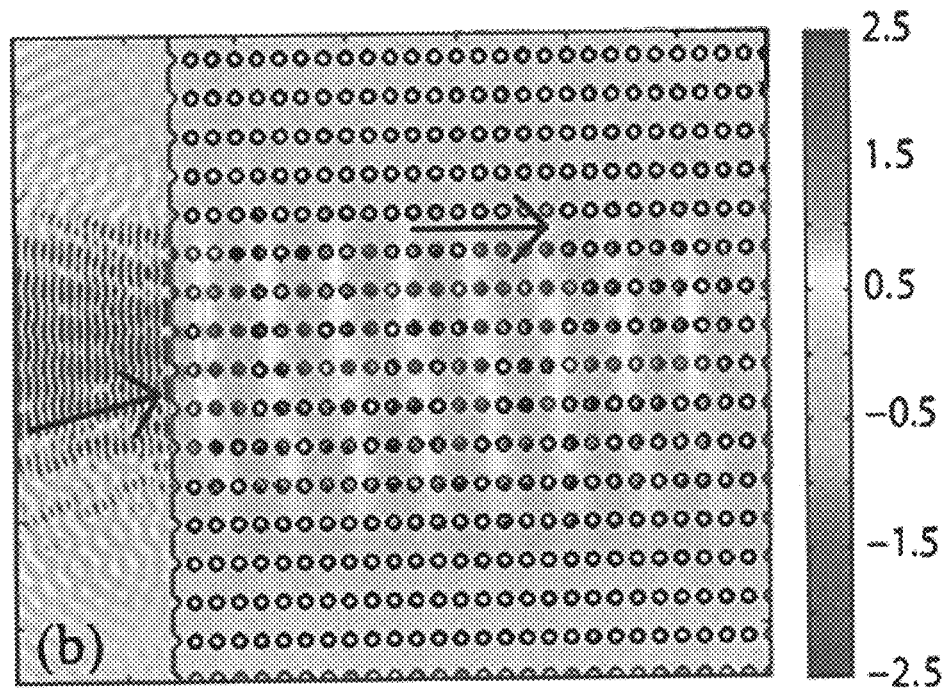
Figure 7C:
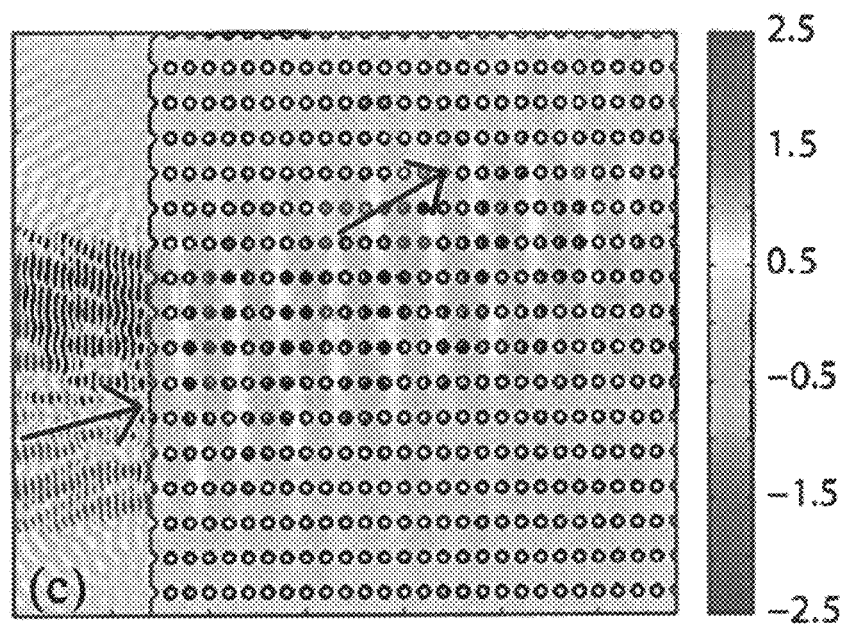

At this point, the photonic-crystal superprism is obtained through the above steps, when the light makes incidence at the above incidence angle, the photonic crystal is very sensitive to the frequency of the light, and may significantly separate the light with different frequencies. FIG. 7a~7c show a three-channel frequency-division diagram of the photonic crystal superprism, wherein the wavelengths of the incidence light in FIGS. 7a, 7b and 7c are 1,578.90 nm, 1,550 nm and 1,537.90 nm, respectively. In FIGS. 7a-7c, the darker the color of the area is, the stronger the light intensity is. Obviously, after the light makes incidence, the deflection angles of the light with different frequencies in the photonic crystal are different. As shown by the arrows in the figure, when the light makes incidence at the same incidence angle, the light propagates in the lower-right direction in FIG. 7a, in FIG. 7b, light propagates horizontally, and in FIG. 7c, light propagates in the upper-right direction, resulting in that the light propagation paths with different frequencies are significantly separated. This frequency-related path is a channel of the photonic-crystal superprism.

The present invention also provides a photonic-crystal superprism, an auto-collimation area and a low group velocity area in an equifrequency graph of the photonic crystal superprism are overlapped, and an equal incidence angle thereof is intersected with the overlapped area. The photonic-crystal superprism may be a porous structure or a media column structure. The photonic-crystal superprism may be designed with the above design method to determine the optimal structure parameters including filling ratio, the constant term of a lattice, as well as the thickness and the length of a photonic crystal, the auto-collimation area and the low group velocity area in the equifrequency graph of the photonic crystal are facilitated to be overlapped as much as possible, the overlapping area is defined as a work area, an equal incidence-angle line intersected with the work area is selected, an appropriate incidence angle in the intersection point is selected, the incidence angle is facilitated to be close to a vertical incidence angle as much as possible, thereby reducing the complexity of a optical path design.

The photonic-crystal superprism of the invention may be widely applied to a spectrometer, an interferometer, a wavelength division multiplexer, a detector and the like.

In a summary, the ultrahigh-resolution photonic-crystal superprism of the invention and the method for designing the same optimize the structure parameter of the photonic crystal, facilitate the auto-collimation region and the low group velocity region in the equifrequency graph of the photonic crystal to be overlapped as much as possible, define the overlapping region as the work area, rotates appropriately the photonic crystal to intersect the equal incidence-angle line with the work area, and selects the appropriate incidence angle to facilitate the incidence angle to be close to the vertical angle as much as possible, thereby conveniently applying the optical path design of an instrument. The photonic-crystal superprism of the invention is very sensitive to the frequency of the light making incidence at the above incidence angle, and may separate the light with different frequencies significantly. Meanwhile, the photonic-crystal superprism of the invention has good integrality and wide application range, can be applied to a high-resolution spectrometer, a wavelength division multiplexer, a high sensitive detector and the like, and has important practical value. Therefore, the invention overcomes effectively various shortcomings in the prior art and has a high industrial utility value.

The above examples only illustratively describe the principles and the efficacy of the invention, and are not intended to limit the invention. It will be apparent to those skilled in the art that various modifications or changes can be made in the above-described examples without departing from the spirit and scope of the invention. Accordingly, it is intended that the appended claims shall cover all equivalent modifications or changes made without departing from the spirit and technical concept of the invention.

What is claimed is:

1. A method for designing an ultrahigh-resolution photonic-crystal superprism, wherein the method comprises at least the following steps:

Step S1: selecting a medium material, and determining a structure type and a structure parameter of a photonic crystal;

Step S2: obtaining an equifrequency graph of the photonic crystal, and looking for an auto-collimation area in the equifrequency graph;

Step S3: obtaining the group velocity distribution of each point in the equifrequency graph, and looking for a low group velocity area;

Step S4, optimizing the structure parameter of the photonic crystal, facilitating the auto-collimation area and the low group velocity area in the equifrequency graph of the photonic crystal to be overlapped as much as possible, and defining the overlapping area as a work area;

Step S5: obtaining an equal incidence-angle line, rotating the photonic crystal to intersect the equal incidence-angle line with the work area, and selecting the appropriate incidence angle in an intersection point to complete the design of the photonic-crystal superprism.

2. The method for designing the ultrahigh-resolution photonic-crystal superprism according to claim 1, wherein the medium material is selected from at least one of silicon, silicon dioxide, germanium, gallium arsenide and gallium nitride.

3. The method for designing the ultrahigh-resolution photonic-crystal superprism according to claim 1, wherein the structure type comprises a two-dimensional structure or a three-dimensional structure.

4. The method for designing the ultrahigh-resolution photonic-crystal superprism according to claim 1, wherein the structure type comprises a porous structure or a medium column structure.

5. The method for designing the ultrahigh-resolution photonic-crystal superprism according to claim 1, wherein the structure type comprises a square-lattice primitive-cell structure, a rectangular-lattice primitive-cell structure, a triangular-lattice primitive-cell structure or a hexagonal-lattice primitive-cell structure.

6. The method for designing the ultrahigh-resolution photonic-crystal superprism according to claim 1, wherein in Step S4, the structure parameter comprises filling ratio, the constant term of a lattice, as well as the thickness and the length of a photonic crystal, at least one of which is changed to optimize.

7. The method for designing the ultrahigh-resolution photonic-crystal superprism according to claim 1, wherein the auto-collimation area comprises an auto-collimation area passing through the entire Brillouin area or a local auto-collimation area.

8. The method for designing the ultrahigh-resolution photonic-crystal superprism according to claim 1, wherein the auto-collimation area comprises a strict auto-collimation area and an adjacent approximate auto-collimation area thereof.

9. The method for designing the ultrahigh-resolution photonic-crystal superprism according to claim 1, wherein the low group velocity is that the group velocity of light propagating in the photonic crystal is less than 3E7 meter/second.

10. The method for designing the ultrahigh-resolution photonic-crystal superprism according to claim 1, wherein the equifrequency graph, the group velocity and the equal incidence-angle line are obtained by theoretical calculation or by an experimental means.

11. A photonic-crystal superprism, wherein an auto-collimation area and a low group velocity area in an equifrequency graph of the photonic crystal superprism are overlapped, and an equal incidence angle thereof is intersected with the overlapped area.

12. The photonic-crystal superprism according to claim 11, wherein the photonic-crystal superprism is a porous structure or a medium column structure.

* * * * *